(12) United States Patent
Zhang et al.

(10) Patent No.: US 10,412,544 B1
(45) Date of Patent: Sep. 10, 2019

(54) VORONOI DIAGRAM-BASED ALGORITHM FOR EFFICIENT PROGRESSIVE CONTINUOUS RANGE QUERY FOR MOVING OBJECTS

(71) Applicant: Jing Tong, Coral Gables, FL (US)

(72) Inventors: Mingjin Zhang, Miami, FL (US); Naphtali Rishe, Miami Beach, FL (US); Weitong Liu, Redwood City, CA (US); Jahkell Lazarre, Miami, FL (US); Tao Li, Coral Gables, FL (US)

(73) Assignee: The Florida International University Board of Trustees, Miami, FL (US)

( * ) Notice: Subject to any disclaimer, the term of this patent is extended or adjusted under 35 U.S.C. 154(b) by 0 days.

(21) Appl. No.: 16/266,479

(22) Filed: Feb. 4, 2019

(51) Int. Cl.
*H04W 24/00* (2009.01)
*H04W 4/021* (2018.01)
*H04W 4/029* (2018.01)
*H04W 4/02* (2018.01)

(52) U.S. Cl.
CPC .......... *H04W 4/021* (2013.01); *H04W 4/025* (2013.01); *H04W 4/029* (2018.02)

(58) Field of Classification Search
CPC ...... H04W 4/021; H04W 4/029; H04W 4/025
See application file for complete search history.

(56) References Cited

U.S. PATENT DOCUMENTS

| 2012/0115505 A1* | 5/2012 | Miyake | G06Q 10/06 455/456.1 |
|---|---|---|---|
| 2018/0070213 A1* | 3/2018 | Ali | H04W 4/029 |

\* cited by examiner

*Primary Examiner* — Justin Y Lee
(74) *Attorney, Agent, or Firm* — Saliwanchik, Lloyd & Eisenschenk

(57) ABSTRACT

Devices and methods for providing Voronoi diagram-based progressive continuous range query (CRQ) computation for location-based services are provided. A method can include indexing all interest points using a Voronoi R-tree data structure in a server-side computing device. When a client mobile device sends a CRQ request, the server-side device receives a path of travel and builds a list to store interest points and a min-heap to store split points, iteratively retrieving split points from the min-heap, and reporting the CRQ result progressively until a termination condition is reached.

20 Claims, 7 Drawing Sheets

VORONOI DIAGRAM-BASED ALGORITHM FOR EFFICIENT PROGRESSIVE CONTINUOUS RANGE QUERY FOR MOVING OBJECTS

GOVERNMENT SUPPORT

This invention was made with government support under Award Numbers IIP-1338922, U.S. Pat. No. 1,213,026, CNS-1429345, and CNS-1532061 awarded by the National Science Foundation (NSF). The government has certain rights in the invention.

BACKGROUND

Computer-based applications that relate to moving object data (e.g., traffic monitoring, flight control, and location-based advertisements and recommendations) typically require Location-Based Service (LBS), involving querying for the historical, current, or predictive future locations of moving objects. A continuous range query (CRQ) is one technique that can be applied in the moving object database field for location-based applications. However, existing CRQ techniques are limited by requiring the use of extensive computer resources and slow response times for returning query results.

BRIEF SUMMARY

Embodiments of the subject invention provide methods and apparatuses for Voronoi diagram-based location services that return the result of a query to a user device. Continuous output and maintenance of the query results can be provided while the query point moving. The results can be progressively outputted and change when the order of the respective data objects' relative distance to the user device changes. The herein described progressive continuous range queries can be utilized for many location-based applications.

In one embodiment of the subject invention, one type of progressive continuous range query (PCRQ), can be considered with respect to a moving point. PCRQ can retrieve all objects of interest within a specified range. The result should change when objects of interest move in or out of range. The PCRQ method can be applied to a broad number of applications. For instance, "If I continue moving in this direction, what will be the gas stations within 0.5 miles for the next 10 minutes?" or "What will be the restaurants within 1 mile at any point during my route from city A to city B?"

DETAILED DESCRIPTION

Embodiments of the subject invention provide methods and apparatuses for Voronoi based location-based services that return a query result to a user device. Continuous output and maintenance of the query results can be provided while the query point is moving. Embodiments also provide methods and apparatuses that can retrieve the continuous range query result to every point on the path of a moving object. The results can be progressively outputted. Progress continuous range queries (PCRQs) can be utilized for many location-based applications.

Figure 1:
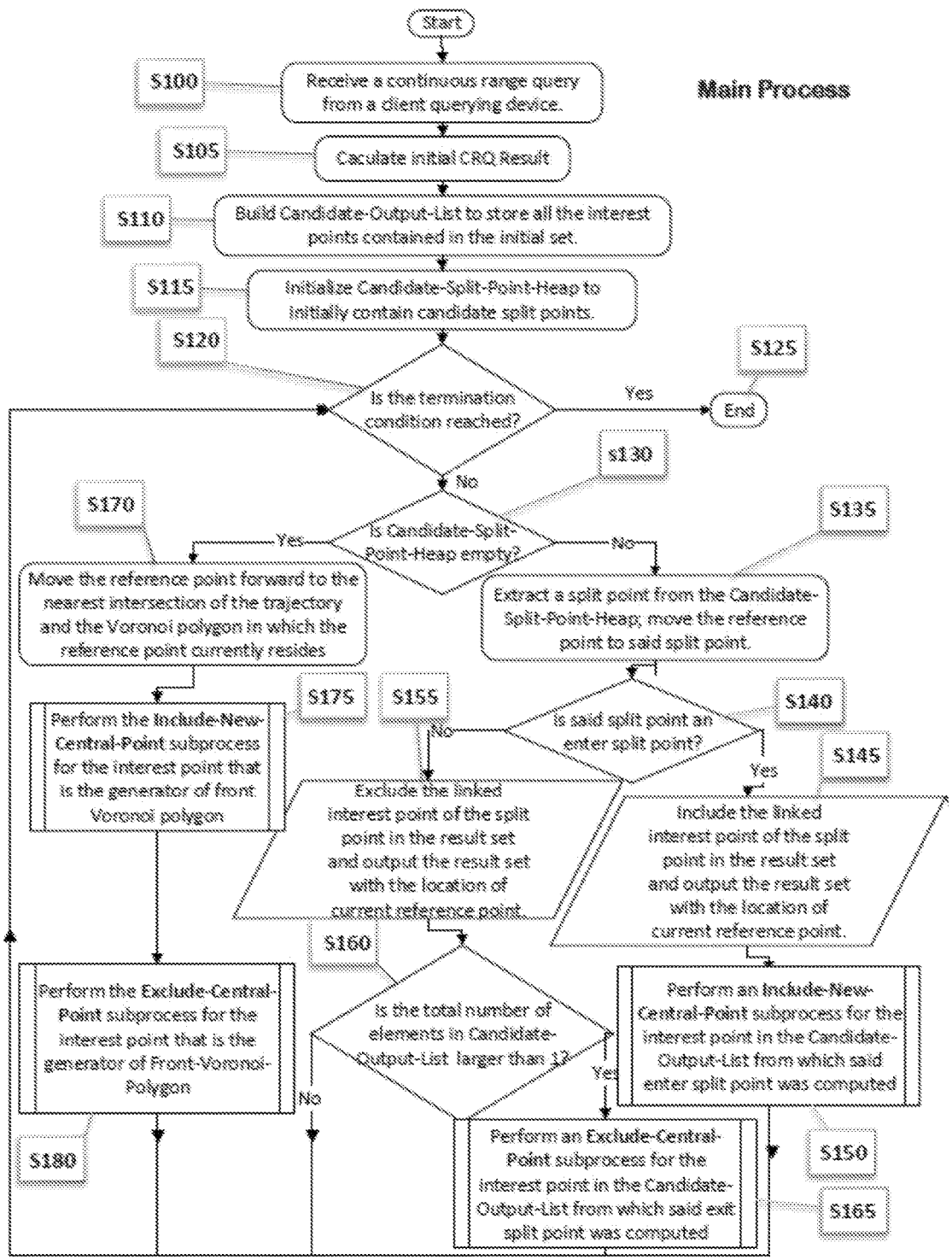
FIG. 1 is a diagram showing a process flow of a progressive continuous range query (PCRQ) execution that utilizes a Voronoi diagram.
Figure 5:
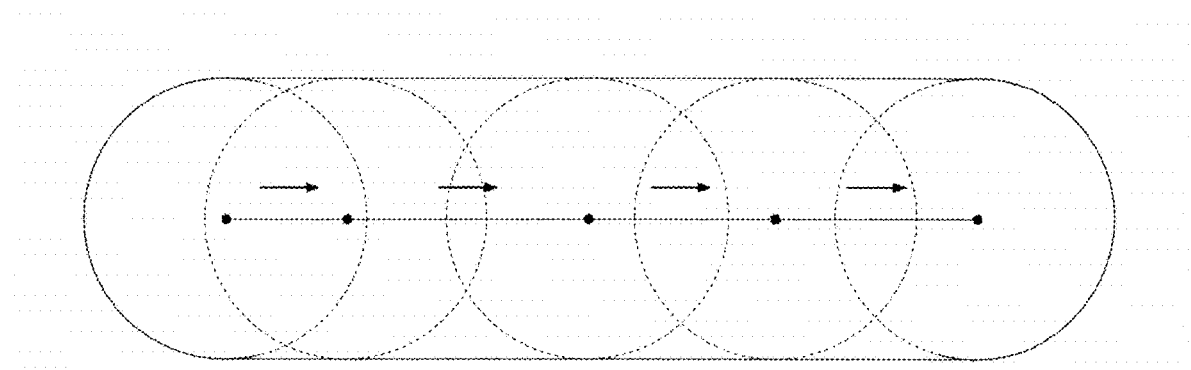
FIG. 5 is a diagram illustrating a query range of a mobile device in motion.
Figure 6:
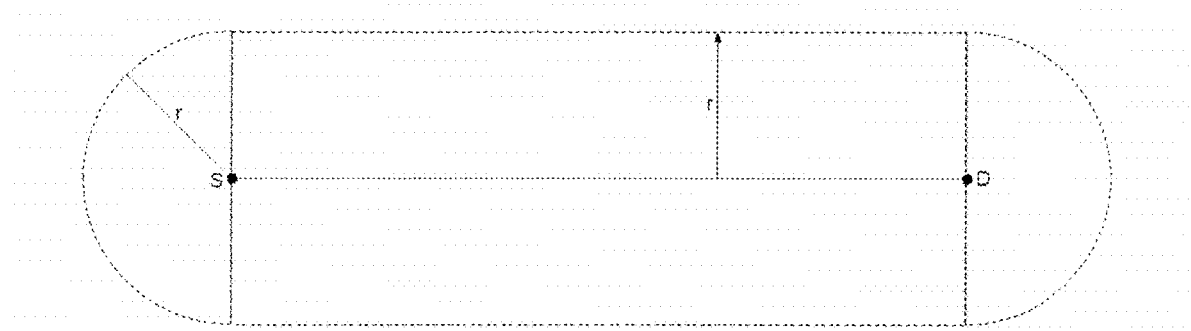
FIG. 6 is a diagram illustrating a query region of a PCRQ.

A progressive continuous range query (PCRQ) continuously searches for objects within a range r while a point or user is moving along a path (query point trajectory). A typical workflow of a PCRQ with a Voronoi diagram is shown in FIG. 1. A Voronoi diagram is the partitioning of a plane of points into Voronoi polygons—convex polygons that each comprise one generating point/seed. FIG. 5 shows the time-slice of a point surrounded by a query range moving along an interval. When a query point q is moving along a path, its query range with radius r sweeps across an area called a query region. In FIG. 6, the area within the outer dashed line is the query region. The query region's area can be equal to the sum of the areas of one rectangle and two semicircles (one full circle). Each element in the result set from a PCRQ query can be expressed as the following two-component tuple:

$$\text{result}[i] = \langle (A,B), (f_1, f_2, \ldots, f_m) \rangle (i=0,1,2,\ldots), \qquad (1)$$

wherein points A and B are located in a query segment. This formula states that for an arbitrary point Q between A and B in the query segment, there are m points that fall into the range r (for example, $f_1, f_2, \ldots, f_m$). The domain region of an interest point is bounded by a circle of radius r centered at the interest point. The purpose of the domain region is that when the moving object is outside of the domain region, it can be safely assumed that the data point is not within the moving object's query range.

Figure 7:
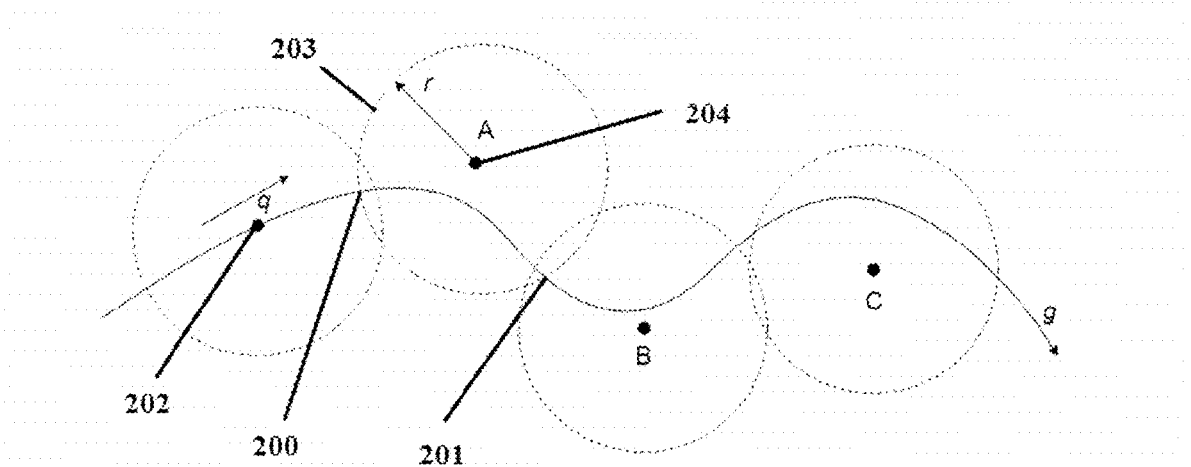
FIG. 7 is a diagram illustrating an enter split point and an exit split point in a PCRQ.

The intersections between these domain region perimeters and the query point trajectory are known as split points. The radius of the domain region is the same as the radius of query range circle. The PCRQ result can change when the query point passes these split points. Split points are divided into two categories, enter split-points 200 and exit split points 201. Both an enter split point 200 and an exit split point 201 are generated by the intersections of the trajectory of the query point 202 and the perimeter 203 of a domain region of an interest point 204 (see, FIG. 7). For an interest point A, when the query point q passes it's enter split point 200, A enters the query range of q (which can be equivalently stated as: q enters the range of A). Conversely, when q passes A's exit split point 201, A is no longer in the query range of q. When a query point q just passes the enter split point of an arbitrary interest point p, p is exactly on the border of the perimeter of p. When q passes, p's enter split point, p enters the domain region circle of q. Likewise, when q encounters p's exit split point, p is exactly on the border of the domain region circle with radius r. When q passes p's exit split point along the trajectory, p exits range r.

PCRQ outputs the result of a continuous range query (CRQ) progressively. A result can be obtained progressively through the use and generation of split points. The split points can be stored into a min-heap of split points (herein referred to as "Candidate-Split-Point-Heap"). A min-heap is a binary tree structure, such that the data contained in each node is less than (or equal to) the data in that node's children. The top of Candidate-Split-Point-Heap has the minimum distance to the query point among all split points in the heap. A Voronoi diagram can be used to reduce the number of elements in the Candidate-Split-Point-Heap for PCRQ queries.

The methods and devices described herein can reduce the amount computing time required to generate a large result set through the use of split points. Furthermore, a user's location can change significantly while waiting for a large result, thus possibly making the result irrelevant by the time the user receives it. Additionally, the herein disclosed method also allows for continuous output of the predictive query results while the query point is moving.

Embodiments of the subject invention can have several characteristics: (1) progressive outputting of results; (2) access a minimal amount of nodes needed to produce a result; (3) scalable and use minimal resources of a CPU, an IO, and memory (this is useful for applications on servers to handle large amount of queries (e.g., large-scale online location based services and related map services and applications on devices with limited CPU and memory, such as GPS navigation devices with embedded systems)); and (4) no restriction that query trajectories consist of only line segments, the method being capable of handling other query trajectories that comprise or consist of curves, loops, or the like. Embodiments of the subject invention can post one query for the entirety of the segments in a path.

Given a query point q moving along some path g, a set of interest points I, and a range r, a subset of stationary interest points in I (each interest point's distance to q is less than r) is continually returned as result R. Path g is a set of arbitrary points along a trajectory; each point can be a tuple of coordinates; and path g is the trajectory of a query point q represented as a geometric shape, which may be, but is not limited to be, a line segment, a polyline, or a curve.

A query point or moving object q can travel along a path g; the query point can be described as a tuple of coordinates at any given time and can represent an object in physical or virtual multidimensional space (for example, a person, an animal, a car, a plane, a smartphone, or a drone). Each interest point p in I, may represent an object of same or different type than that of other interest points in I. Every interest point p in I can be a stationary object, for example: a gas station, amusement park, monument, governmental building, police station, restaurant, hotel, or an objective in a videogame. Range r is a length that represents the radius of q's searching circle. That is, the extent to which interest points is considered within range of q.

PCRQ result set R is a set comprising of tuples, wherein each tuple contains a split point along with an ordered collection of interest points that are within query point q's searching circle when q is at said split point. An example is:

$$R=\{K<s1, \{p23,p50,p11,p9\}>, <s2, \{p23,p50,p11,p9,p44\}>, <s3,\{p50,p23,p11,p9,p44\}>\}. \qquad (2)$$

In this example, when query point q passes split point s1, then p23 is the closest interest point within range, p50 is the next closest interest point within range, and so on. R is progressively returned as q travels along g, returning a possibly different result than what was returned previously. Updating the PCRQ result set comprises of inserting a tuple that comprises the split point that q reached along with the interest points that fall within q's range into the result set.

Prior to execution of the algorithm to respond to the PCRQ, the interest points are stored and indexed using a VoR tree method by a server-side device. For example, in FIG. 8, the interest points {p1, p2, . . . , p15} are "bound" using a Voronoi diagram.

In one embodiment, as seen in FIG. 1, a user can initiate a continuous range query by transmitting a request from a device S100. The device's location at the time of the request can be an initial reference point.

In one embodiment, an initial PCRQ result set comprising a set of central points and peripheral points can be then computed using either a Voronoi-based range- or k-nearest neighbor technique S105. The central points comprise the initial result of the range query, (q(p, r)), interest points that are located within a radius r centered at the initial reference point p. If the range query result q(p, r) results in an empty set, the initial reference point p can be located at the interest point that is nearest to the user's device. The peripheral points are the adjacent neighbors of the central points (as defined by the Voronoi diagram).

A range query can be performed on a Voronoi R-tree by recursively traversing partially covered internal nodes in the moving object's initial domain region, outputting leaf nodes that intersect the domain region. If a node is fully covered by the domain region, then all the leaf nodes in the subtree rooted at that node can be included in the PCRQ result, since as all of its leaf nodes must intersect the domain region. If a node does not intersect the domain region, the subtree rooted at that node is not traversed, as none of its children can possibly be in the domain region.

In another embodiment, a range query can be performed by a modified Voronoi kNN method. An initial query for one nearest point (1NN) can be calculated using a VoR-tree algorithm. This 1NN result can be inserted into a queue. A queue can be any data structure for which the primary operations are "enqueuer" or inserting elements at the back of the queue, and "dequeue" or removing elements from the front of the queue. The queue can be dequeued to retrieve a point (a leaf node). If the retrieved point is within the moving object's domain region, it can be included in the PCRQ result, and its adjacent interest points/generators (as defined by the Voronoi diagram) can be retrieved and enqueued. If the retrieved point is not within the moving objects domain region, the retrieved point is not included in the PCRQ result, and its adjacent points/generators are neither retrieved nor enqueued. This procedure can be repeatedly performed until the queue is empty. That is, any points in the queue will be finically de-queued, with points enqueued first as the adjacent neighbors then de-queued in the repeating process.

Figure 8:
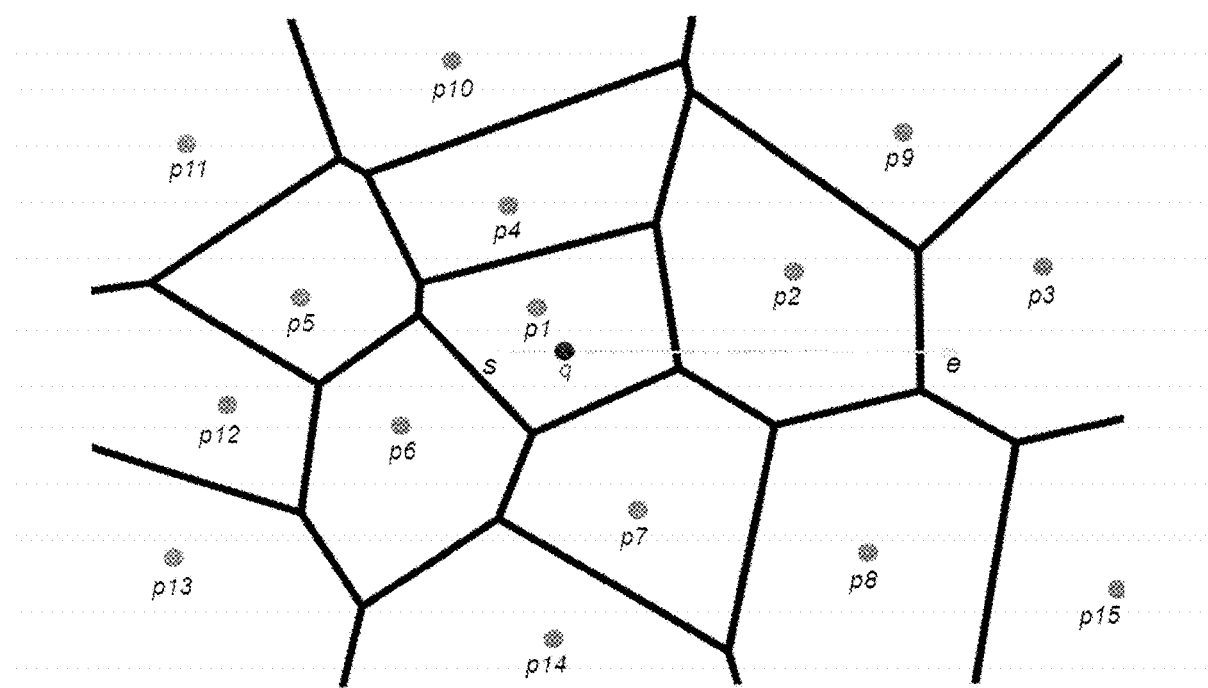
FIG. 8 is a diagram illustrating a query point traveling along a query segment, using a Voronoi diagram as part of a PCRQ.

A next step can be to build a list (hereinafter referred to as "Candidate-Output-List") to store all interests points in the initial PCRQ result S110. Each node of the Candidate-Output-List comprises an interest point and references to the interest point's adjacent neighbors that are also stored in Candidate-Output-list, which is a list that stores the points that are potentially in the final result set. The Candidate-Output-list can include the adjacent neighbors that are outside of the query range circle. As seen in FIG. 8, if interest points p1 and p4 are both in the Candidate-Output-List, both interest points have a reference pointer to the another as they are an adjacent pair.

Collectively, these reference pointers to the adjacent generators are elements of a reference graph. The reference graph is an abstract data structure that interconnects multiple nodes (for example, the interest points in the Candidate-Output-List). The reference graph can be represented by multiple forms, including a collection of pointers or an adjacency matrix. It should be appreciated by one of ordinary skill in the art that any data structure that is similar to the above-described reference graph is valid.

A next step can be to initialize a result set by, for example, including the interest points in said result of range query q(p, r). A next step can be to output the PCRQ result set as the initial PCQR result. The PCQR result may include additional information, such as the current location of the reference point to indicate that result set is changed, starting from the current location of the reference point.

A next step can be to initialize a min-heap data structure (hereinafter referred to as "Candidate-Split-Point-Heap") to initially contain candidate split points S115. The Candidate-Split-Point-Heap is a min-heap that contains candidate split points, and candidate split points may or may not be a finial split point in the result set. For each interest point in the Candidate-Output-List, its respective candidate split points are the points at which the trajectory of the user intersects with the perimeter of the respective interest point's domain region, wherein the domain region of an interest point is the area around the point with the radius r. The split points in the Candidate-Split-Point-Heap are ordered by their distance to the reference point. A linking relationship of each split point in the Candidate-Split-Point-Heap to a respective interest point in the Candidate-Output-List can be continuously updated and maintained, as the user device moves along the trajectory.

A next step can be to iteratively, perform the following steps until a termination condition is reached S120, (for example, as the reference point moves to or exceeds the end-point of the trajectory path). If the termination condition is reached, the process can end S125.

If the Candidate-Split-Point-Heap is not empty S130, a candidate split point can be retrieved and removed from the Candidate-Split-Point-Heap and the reference point can be moved to the location of the retrieved candidate split point S135. The reference point can thought of conceptually as a virtual user that does not actually move.

If the retrieved candidate split point is the initial point of entry along the trajectory into a domain region, hereinafter referred to as "enter split point," S140, that is the enter split point's linked interest point starts to be within the domain region of the reference point, then the linked interest point can be included in the result set, and output the result set as the next CRQ result S145. The CRQ result set can comprise additional information, such as the location of current referent point, an indication that the CRQ result set has changed, starting from the current location of the reference point.

Figure 3:
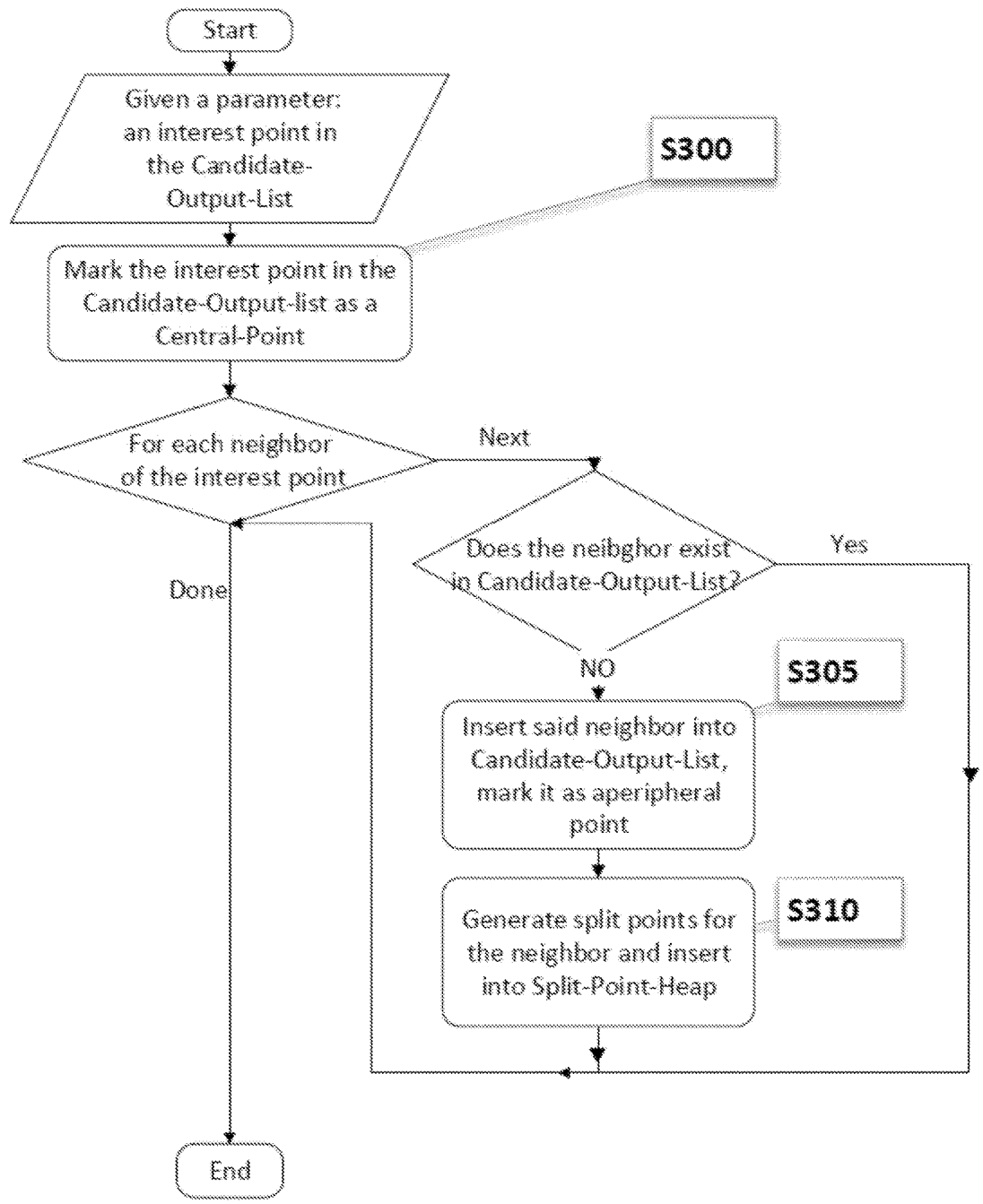
FIG. 3 is a diagram showing of process flow of an Include-New-Central-Point process.

A next step can be to perform an Include-New-Central-Point procedure S150, as seen in FIG. 3, for the linked interest point in the Candidate-Output-List. A first step can be to mark the linked interest point as a Central-Point S300. Insert each adjacent neighbor of a linked interest point that is not in the Candidate-Output-List, into the Candidate-Output-List as a Peripheral-Point S305. A next step can be to compute the split points of the newly-generated Peripheral-Point (in previous step 305) and maintain a linking relationship between each point in the Candidate-Split-Point-List and the interest point in the Candidate-Output-List from which said Candidate-Split-Point was computed S310.

If the retrieved candidate split point is the initial point of exit along the trajectory from a domain region, hereinafter referred to as "exit split point," and that is the exit split point's linked interest point starts to be outside the domain region of the reference point, then the linked interest point can be excluded from the result set and output the result set as the next CRQ result S155. The CRQ result set can comprise additional information, such as the location of current referent point, an indication that the CRQ result set has changed, starting from the location where the reference point currently is.

Figure 2:
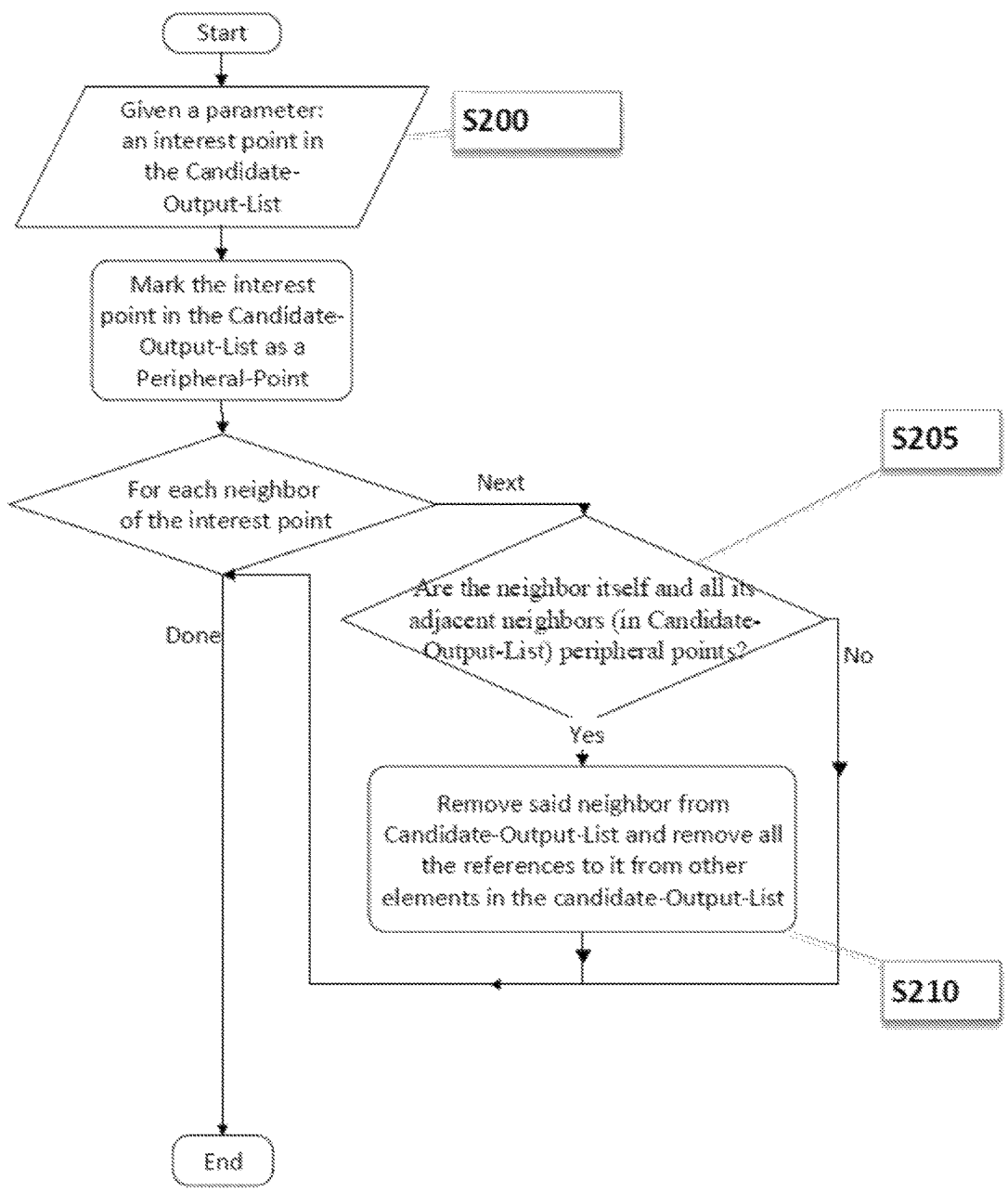
FIG. 2 is a diagram showing of process flow of an Exclude-Central-Point process.

If the total number of elements in the Candidate-Output-List is greater than one S160, then perform an Exclude-Point-Procedure, as seen in FIG. 2, for the interest point linked to the exit split point S165. A first step can be to mark the linked interest point as a Peripheral-Point S200. For each adjacent neighbor of the interest point, if it is a Peripheral Point and all of its adjacent neighbors in Candidate-Output-List are Peripheral Points S205, then remove the linked interest point from the Candidate-Output-List. Additionally all references from the other elements in the Candidate-Output-List, including pointers, can be removed S210.

If the Candidate-Split-Point Heap is empty, the reference point can be moved forward along the trajectory to the nearest intersection of the trajectory and the Voronoi polygon in which the reference point is located S170. At this point, the reference point is located on the edge of two adjacent Voronoi polygons. The Voronoi polygon that the reference point was located in hereinafter is referred to as Back-Voronoi-Polygon of the reference point and the other Voronoi polygon is hereinafter referred to as Front-Voronoi-Polygon of the reference point. The Include-New-Central-Point procedure, as seen in FIG. 3, can be performed for the interest point that is the seed/generator of the front Voronoi polygon S175. The Exclude-Central-Point procedure, as seen in FIG. 2, can be performed for the interest point that is the seed/generator of the front Voronoi polygon S180. In an embodiment, interest points can be outputted for each split point with information to indicate whether the outputted interest point is to be included or exclude after he reference point passes the respective split point.

Embodiments of the subject invention can be deployed locally or based upon a client server model. A user can transmit a location and a destination to a remote server. The server, including a computer readable medium comprising stored instructions thereon, the instructions when executed cause a processor to bind the set of interest points; calculate an initial CRQ result; initialize a linked list of interest point entries; initialize a heap that consists of entry and exit split points; continually maintain the linked list and heap; and report the result progressively to the user.

Figure 4:
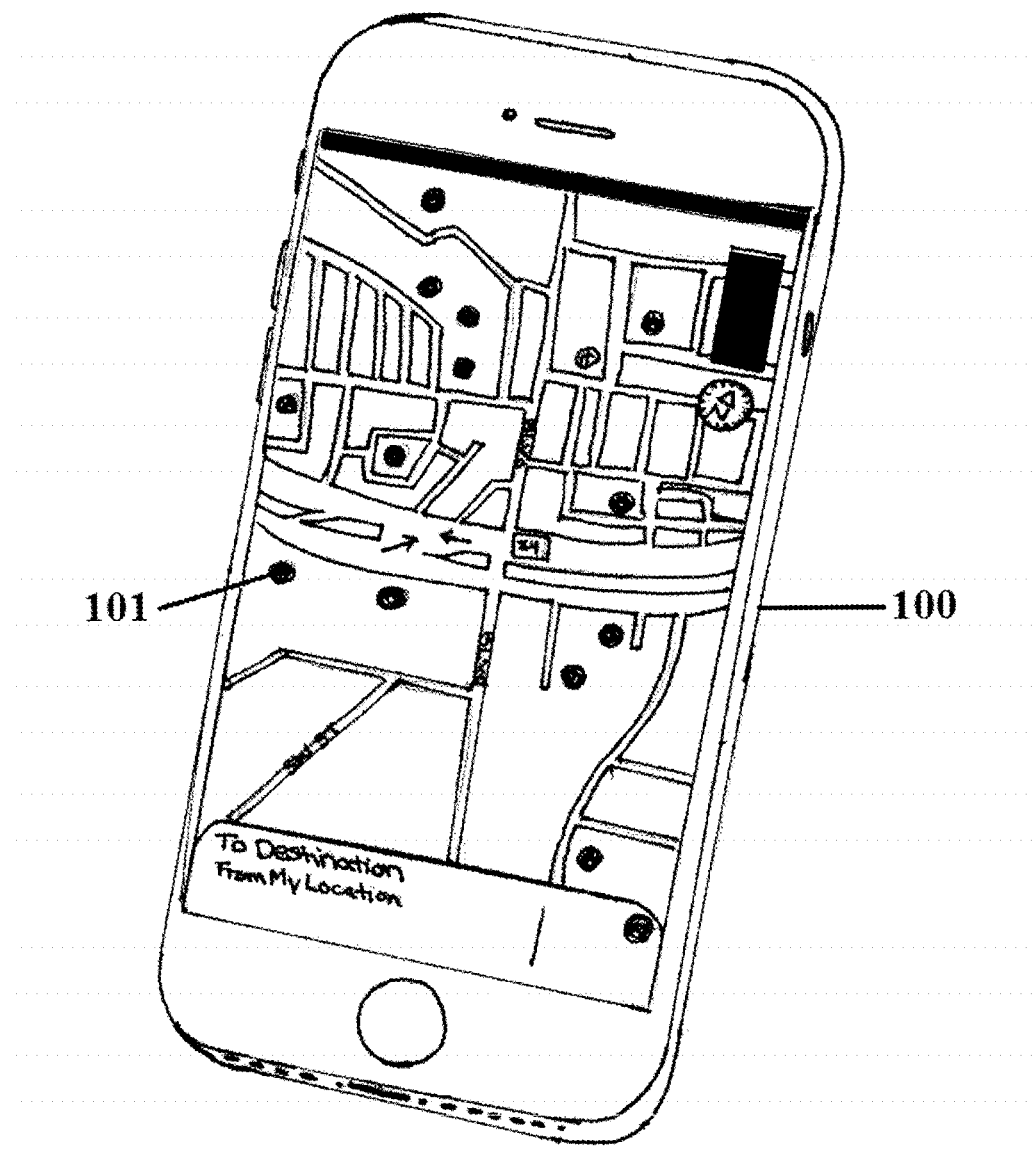
FIG. 4 is an illustration of graphical results of PCRQ on a mobile device.

In embodiments of the subject invention, the results can be displayed on a visual map on an electronic device, for example, a mobile device, a tablet, or a lap top. As seen in FIG. 4, a user's mobile device 100 provides position and can use location-based services to transmit the user's location to a remote server. The server can be configured to process the user's location and continuously return a set of interest points 101 to the mobile device. An interest point can include a stationary or moving object (for example, a hotel, a motel, a hospital, a residence, an apartment complex, governmental building, movie theatre, a park, a national monument, a building, or a school, college, or university).

Figure 9:
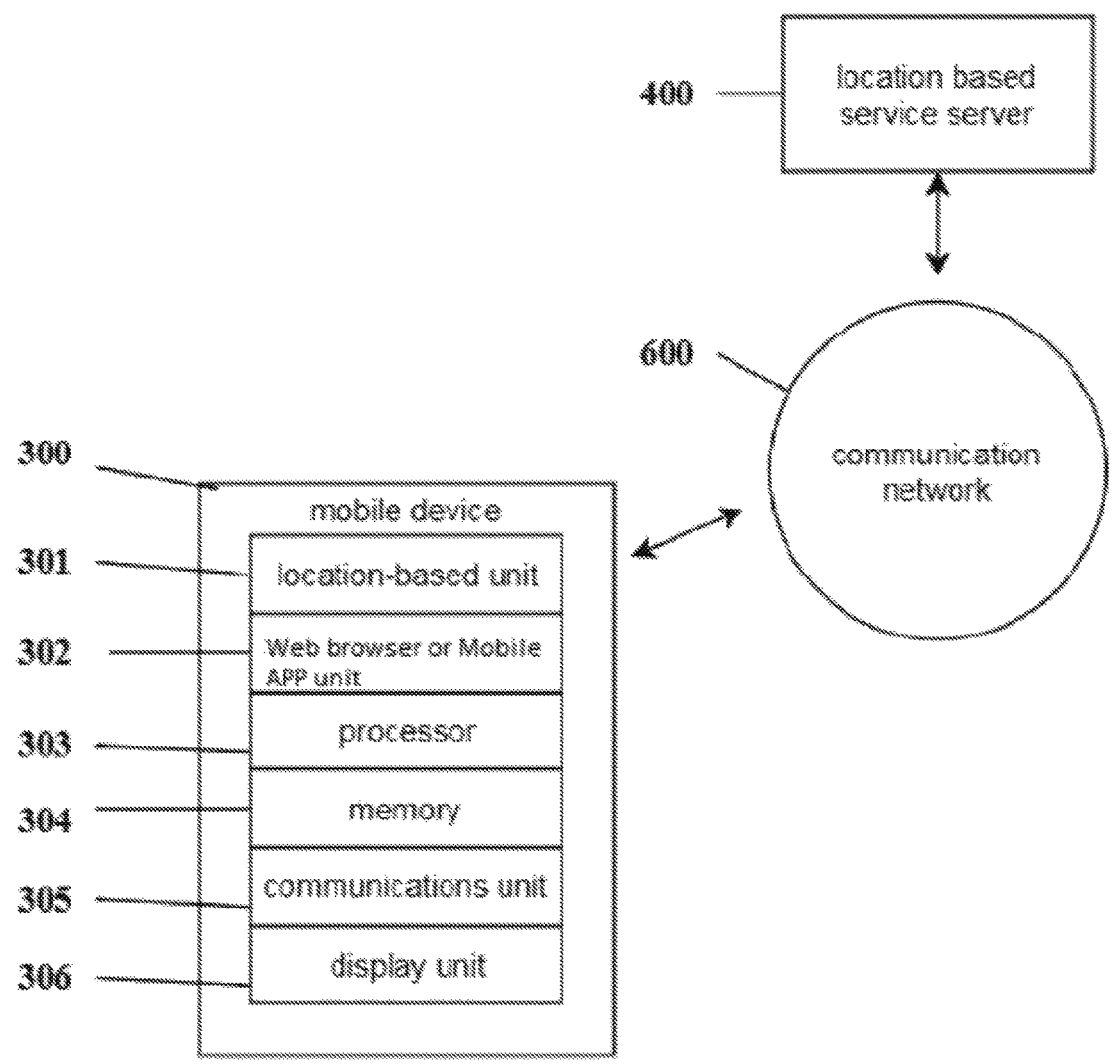
FIG. 9 is a block diagram of a system for a Voronoi diagram-based range query.

FIG. 9 shows an embodiment of a system that may be utilized for a continuous range query. This system includes a mobile device 300 and a location-based service server 400, that may communicate over one or more wired and/or wireless communication networks 600. The wired or wireless communication networks 600 may be public, private or a combination of public or private networks.

The mobile device 300 may be, for example, a cellular phone, a smartphone, a laptop computer, a tablet computer, or any other appropriate computing device. The mobile device 300 includes a location-based services unit 301, a web browser or mobile app unit 302, a processor 303, memory 304, a communications unit 305, and a display unit 306. The mobile device 300 may communicate data to/from the location-based service server 400 and the interest points server 500. The web browser or mobile app unit 302 may include and/or communicate with one or more sub-modules that perform functionality such as rendering HTML (including but not limited to HTML5), rendering raster and/or vector graphics, executing JAVASCRIPT, and/or rendering multimedia content.

In one embodiment, the web browser or mobile app unit 302 may implement Rich Internet Application (RIA) and/or multimedia technologies such as ADOBE FLASH and/or other technologies compatible with Internet based communications. The web browser unit 302 may implement RIA and/or multimedia technologies using one or web browser plug-in modules (e.g., ADOBE FLASH), and/or using one or more sub-modules within the web browser or mobile app unit 302 itself. The web browser or mobile app unit 302 may display data on one or more display devices (not depicted) that are included in or connected to the mobile device 300, such as a liquid crystal display (LCD) display or monitor. The mobile device 300 may receive input from the user of the mobile device 300 from input devices (not shown) that are included in, or connected to, the mobile device 300, such as a keyboard, a mouse, a microphone or a touch screen, and provide data that indicates the input to the web browser or mobile app unit 302. In an embodiment, the web browser or mobile app unit 302 can be a standalone mobile application that sends PCRQ requests and displays the results.

The communications unit 305 may be, for example, a communications port, a wired transceiver, a wireless transceiver, and/or a network card. The communications unit 305 may be capable of communicating using technologies such as Ethernet, fiber optics, microwave, xDSL (Digital Subscriber Line), Wireless Local Area Network (WLAN) technology, wireless cellular technology, BLUETOOTH technology and/or any other appropriate technology.

The location-based server 400 can utilize a wireless communications system, such as a cellular telephone system and provide or receive location-based data to the mobile device 300 and perform further processing on such data to complete or refine a request calculation.

In an embodiment, the mobile device 300 can include the location-based service server 400.

Although FIG. 9 shows that the mobile device 300 includes a single processor 303, single memory unit 304, single communication unit 305, single display unit 306, and location-based unit, the mobile device 300 may include multiples of each or any combination of these components, and may be configured to perform the functionality described above.

Algorithms have been disclosed in the foregoing for the effective resolution of continuous range queries and that return results in a progressive fashion (predictive, real time, or historical). While exemplary embodiments and examples have been presented, they do not limit the scope of the invention and its use cases but serve as illustrations of use cases. That is to say that neither a GPS, database, smartphone, smartphone application, nor any of the technologies in the exemplary embodiments need to be used in the deployment of embodiments of the present invention. Embodiments of the subject invention can be implemented locally, remotely, on an internet-enabled or non-Internet-enabled personal computer (PC), server, smartphone, any device or equipment, or any combination of the above, all possibly interconnected via a wired or wireless network.

The methods and processes described herein can be embodied as code and/or data. The software code and data described herein can be stored on one or more machine-readable media (e.g., computer-readable media), which may include any device or medium that can store code and/or data for use by a computer system. When a computer system and/or processer reads and executes the code and/or data stored on a computer-readable medium, the computer system and/or processer performs the methods and processes embodied as data structures and code stored within the computer-readable storage medium.

It should be appreciated by those skilled in the art that computer-readable media include removable and non-removable structures/devices that can be used for storage of information, such as computer-readable instructions, data structures, program modules, and other data used by a computing system/environment. A computer-readable medium includes, but is not limited to, volatile memory such as random access memories (RAM, DRAM, SRAM); and non-volatile memory such as flash memory, various read-only-memories (ROM, PROM, EPROM, EEPROM), magnetic and ferromagnetic/ferroelectric memories (MRAM, FeRAM), and magnetic and optical storage devices (hard drives, magnetic tape, CDs, DVDs); network devices; or other media now known or later developed that are capable of storing computer-readable information/data. Computer-readable media should not be construed or interpreted to include any propagating signals. A computer-readable medium of the subject invention can be, for example, a compact disc (CD), digital video disc (DVD), flash memory device, volatile memory, or a hard disk drive (HDD), such as an external HDD or the HDD of a computing device, though embodiments are not limited thereto. A computing device can be, for example, a laptop computer, desktop computer, server, cell phone, or tablet, though embodiments are not limited thereto.

A greater understanding of the present invention and of its many advantages may be had from the following examples, given by way of illustration. The following examples are illustrative of some of the methods, applications, embodiments and variants of the present invention. They are, of course, not to be considered as limiting the invention. Numerous changes and modifications can be made with respect to the invention.

Example 1

A user driving in a vehicle with a Global Positioning System (GPS) application installed on an Internet-enabled smartphone may inquire about the closest hotels as the user embarks on an 18-hour trip between his home in Miami, Fla. and his parents' home in Newark, N.J. As the user is driving, the user would like to know the hotels that are within 3 miles at any point along the planned route.

Using the user's current geographical location and driving route, the service determines all the hotels at any point along the planned route—the split points and the names and locations of the hotels are returned to the user's GPS app.

Example 2

The service can report the gas stations that will be within a predetermined radius during a drive along a path between Miami and Tampa.

Example 3

The service can report and update in real time the pizzerias within a predetermined radius during a walk from a first location to a second location.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein (including those in the "References" section) are incorporated by reference in their entirety, including all figures and tables, to the extent they are not inconsistent with the explicit teachings of this specification.

What is claimed is:

1. A system for performing a progressive continuous range query for a location-based service for moving objects, the system comprising:
    a mobile device;
    a computer-readable medium comprising stored instructions that when executed cause at least one processor to:
    access a plurality of interest points, each bounded by a Voronoi diagram-based R-tree, that surround a trajectory of the mobile device,
    compute a circular area centered at the mobile device and a respective circular area centered at each respective interest point of the plurality of interest points that surround the trajectory of the mobile device;
    compute an initial range query result comprising either each interest point within the circular area centered at the mobile device and any adjacent neighbor of each respective interest point within the circular area centered at the mobile device or the interest point closest to the mobile device and any adjacent neighbor of the interest point closest to the mobile device,
    an adjacent neighbor being an interest point adjacent to another interest point as determined by a Voronoi diagram;
    detect each point of intersection between the trajectory of the mobile device and a respective perimeter of each circular area surrounding each respective interest point of the plurality of interest points;
    perform the following until a termination condition is reached:
        continuously update the initial range query result by adding an interest point as the mobile device enters a point of intersection moving into the interest point's respective circular area and removing an interest point as the mobile device enters a point of intersection as the mobile device leaves the interest point's respective circular area; and
    output the updated initial range query result to the mobile device.

2. The system of claim 1, the computer-readable medium comprising stored instructions that when executed further causing at least one processor to:
    storing, in computer memory, and continuously ordering each point of intersection by distance from the mobile device and linking each point of intersection with the respective interest point whose circular area is intersected by the trajectory.

3. The system of claim 1, the computer-readable medium comprising stored instructions that when executed further causing at least one processor to:
    insert each adjacent neighbor of the added interest point to the range query result,
    detect each point of intersection between the trajectory of the mobile device and a respective perimeter of each circle centered at an adjacent neighbor; and
    link each point of intersection with the respective adjacent neighbor.

4. The system of claim 3, the number of interest points in the updated initial range query result being greater than one, the computer-readable medium comprising stored instructions that when executed further causing at least one processor to:
    respectively determine whether each adjacent neighbor of the removed interest point and each adjacent neighbor of the each adjacent neighbor of the removed interest point is an adjacent neighbor of an interest point in the updated initial range query result; and if so
    remove the each adjacent neighbor of the removed interest point from the updated initial range query result.

5. The system of claim 1, the computer-readable medium comprising stored instructions that when executed further causing at least one processor to:
    construct a reference graph comprising respective pointers pointing to and from each interest point in the range query result to each of respective neighbor of the respective interest point.

6. The system of claim 1, mobile device comprising the computer readable medium.

7. The system of claim 1, the trajectory being a straight line segment, a curved line segment, or a combination thereof.

8. The system of claim 1, the termination condition being the mobile device reaching an end-point of the trajectory.

9. The system of claim 1, the range query result further comprising at least one of the real-time location of the mobile device and an indication that the range query result has been updated.

10. The system of claim 1, outputting the updated initial range query result to the mobile device being comprised of:
    outputting interest points individually along with information to indicate whether each individually outputted interest point is to be included in or excluded after the mobile device passes a split point.

11. A computer-based method for performing a progressive continuous range query for a location-based service for moving objects, the system comprising:
    accessing, by a processor, a plurality of interest points, each bounded by a Voronoi diagram-based R-tree, that surround a trajectory of a mobile device,
    computing, by a processor, a circular area centered at the mobile device and a respective circular area centered at each respective interest point of the plurality of interest points that surround the trajectory of the mobile device;
    computing, by a processor, an initial range query result comprising either each interest point within the circular area centered at the mobile device and any adjacent neighbor of each respective interest point within the circular area centered at the mobile device or the interest point closest to the mobile device and any adjacent neighbor of the interest point closest to the mobile device, an adjacent neighbor being an interest point adjacent to another interest point as determined by a Voronoi diagram;

detecting, by a processor, each point of intersection between the trajectory of the mobile device and a respective perimeter of each circular area surrounding each respective interest point of the plurality of interest points;

performing, by a processor, the following until a termination condition is reached:
continuously updating the initial range query result by adding an interest point as the mobile device enters a point of intersection moving into the interest point's respective circular area and removing an interest point as the mobile device enters a point of intersection as the mobile device leaves the interest point's respective circular area; and
outputting, to the mobile device, the updated initial range query result.

12. The computer-based method of claim 11, further comprising:
storing, in computer memory, and continuously ordering each point of intersection by distance from the mobile device and linking each point of intersection with the respective interest point whose circular area is intersected by the trajectory.

13. The computer-based method of claim 11, further comprising:
inserting, by a processor, each adjacent neighbor of the added interest point to the range query result,
detecting, by a processor, each point of intersection between the trajectory of the mobile device and a respective perimeter of each circle centered at an adjacent neighbor; and
linking, by a processor, each point of intersection with the respective adjacent neighbor.

14. The computer-based method of claim 13, the number of interest points in the updated initial range query result being greater than one and further comprising:
respectively determine whether each adjacent neighbor of the removed interest point and each adjacent neighbor of the each adjacent neighbor of the removed interest point is an adjacent neighbor of an interest point in the updated initial range query result; and if so remove the each adjacent neighbor of the removed interest point from the updated initial range query result.

15. The computer-based method of claim 11, the computer-readable medium comprising stored instructions that when executed further causing at least one processor to:
construct a reference graph comprising respective pointers pointing to and from each interest point in the range query result to each of respective neighbor of the respective interest point.

16. The computer-based method of claim 11, the trajectory being a straight line segment, a curved line segment, or a combination thereof.

17. The computer-based method of claim 11, the termination condition being the mobile device reaching an endpoint of the trajectory.

18. A computer-readable medium comprising stored instructions that when executed cause at least one processor to:
access a plurality of interest points, each bounded by a Voronoi diagram-based R-tree, that surround a trajectory of a mobile device,
compute a circular area centered at the mobile device and a respective circular area centered at each respective interest point of the plurality of interest points that surround the trajectory of the mobile device;
compute an initial range query result comprising either each interest point within the circular area centered at the mobile device and any adjacent neighbor of each respective interest point within the circular area centered at the mobile device or the interest point closest to the mobile device and any adjacent neighbor of the interest point closest to the mobile device,
an adjacent neighbor being an interest point adjacent to another interest point as determined by a Voronoi diagram;
insert each adjacent neighbor of the added interest point to the range query result,
detect each point of intersection between the trajectory of the mobile device and a respective perimeter of each circle centered at an adjacent neighbor;
link each point of intersection with the respective adjacent neighbor
detect each point of intersection between the trajectory of the mobile device and a respective perimeter of each circular area surrounding each respective interest point of the plurality of interest points;
storing, in computer memory, and continuously ordering each point of intersection by distance from the mobile device and linking each point of intersection with the respective interest point whose circular area is intersected by the trajectory;
perform the following until a termination condition is reached:
continuously update the initial range query result by adding an interest point as the mobile device enters a point of intersection moving into the interest point's respective circular area and removing an interest point as the mobile device enters a point of intersection as the mobile device leaves the interest point's respective circular area; and
output the updated initial range query result to the mobile device.

19. The computer-readable medium of claim 18, the trajectory being a straight line segment, a curved line segment, or a combination thereof.

20. The computer-readable medium of claim 18, the termination condition being the mobile device reaching an end-point of the trajectory.

* * * * *

UNITED STATES PATENT AND TRADEMARK OFFICE
CERTIFICATE OF CORRECTION

PATENT NO. : 10,412,544 B1
APPLICATION NO. : 16/266479
DATED : September 10, 2019
INVENTOR(S) : Zhang et al.

Page 1 of 1

It is certified that error appears in the above-identified patent and that said Letters Patent is hereby corrected as shown below:

On the Title Page

Item (71) Applicant is corrected to read:
-- Mingjin Zhang, Miami, FL;
Naphtali Rishe, Miami Beach, FL;
Weitong Liu, Redwood City, CA;
Jahkell Lazarre, Miami, FL --.

Signed and Sealed this
Twenty-second Day of October, 2019

Andrei Iancu
*Director of the United States Patent and Trademark Office*